US011120269B2

United States Patent
Che et al.

(10) Patent No.: US 11,120,269 B2
(45) Date of Patent: Sep. 14, 2021

(54) METHOD AND APPARATUS FOR DETERMINING TARGET ROTATION DIRECTION, COMPUTER READABLE MEDIUM AND ELECTRONIC DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Guangfu Che, Beijing (CN); Shan An, Beijing (CN); Xiaozhen Ma, Beijing (CN); Yu Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 16/492,984

(22) PCT Filed: Mar. 29, 2018

(86) PCT No.: PCT/CN2018/081038
§ 371 (c)(1),
(2) Date: Sep. 11, 2019

(87) PCT Pub. No.: WO2018/228021
PCT Pub. Date: Dec. 20, 2018

(65) Prior Publication Data
US 2020/0097729 A1 Mar. 26, 2020

(30) Foreign Application Priority Data
Jun. 16, 2017 (CN) .......................... 201710457547.8

(51) Int. Cl.
*G06T 7/194* (2017.01)
*G06K 9/32* (2006.01)
(Continued)

(52) U.S. Cl.
CPC ....... *G06K 9/00718* (2013.01); *G06K 9/3208* (2013.01); *G06K 9/4652* (2013.01);
(Continued)

(58) Field of Classification Search
CPC combination set(s) only.
See application file for complete search history.

(56) References Cited

U.S. PATENT DOCUMENTS

| 8,446,957 B2 * | 5/2013 | Kurata | ................. H04N 19/521 375/240.16 |
| 2003/0219146 A1 * | 11/2003 | Jepson | .................... G06T 7/251 382/103 |

(Continued)

FOREIGN PATENT DOCUMENTS

| CN | 101369346 A | 2/2009 |
| CN | 102629384 A | 8/2012 |

(Continued)

OTHER PUBLICATIONS

"Calculation of Velocity and Direction of Human Body Movement by Adopting Optical Flow Method".
(Continued)

*Primary Examiner* — Tsung Yin Tsai
(74) *Attorney, Agent, or Firm* — Qinghong Xu

(57) ABSTRACT

The present disclosure relates to a method and apparatus for determining a target rotation direction. Said method for determining the target rotation direction comprises: inputting successive video frames which comprise a rotation target; establishing a background model for the first image frame in said video frames; performing foreground detection
(Continued)

on the video frames other than the first frame by means of said background model so as to determine the rotation axis of said rotation target; obtaining the distribution of optical flow points within a preset region of said rotation axis; determining the direction of rotation of said rotation target according to the distribution of optical flow points within said preset region. By means of the present disclosure, it is possible to simply and efficiently determine the clock direction of a rotation target in a video.

11 Claims, 5 Drawing Sheets

(51) Int. Cl.
  *G06K 9/00* (2006.01)
  *G06T 7/246* (2017.01)
  *G06K 9/46* (2006.01)
(52) U.S. Cl.
  CPC .............. *G06T 7/194* (2017.01); *G06T 7/251* (2017.01); *G06K 2209/21* (2013.01)

(56) References Cited

U.S. PATENT DOCUMENTS

| | | | | |
|---|---|---|---|---|
| 2008/0166022 A1* | 7/2008 | Hildreth | ................. | G06T 7/254 382/107 |
| 2013/0243331 A1* | 9/2013 | Noda | ....................... | G06K 9/46 382/195 |
| 2016/0379074 A1* | 12/2016 | Nielsen | ................. | H04N 7/181 348/143 |

FOREIGN PATENT DOCUMENTS

| | | |
|---|---|---|
| CN | 102819764 A | 12/2012 |
| CN | 102843496 A | 12/2012 |
| CN | 103517041 A | 1/2014 |
| CN | 103593656 A | 2/2014 |
| CN | 104599502 A | 5/2015 |
| KR | 101247319 B1 | 3/2013 |
| RU | 2340922 C1 | 12/2008 |

OTHER PUBLICATIONS

The CN1OA dated May 8, 2020 by the CNIPA.

International Search Report for PCT application No. PCT/CN2018/081038 dated Jun. 5, 2018.

The 1st Office Action for RU patent application No. 2019132178 dated Feb. 24, 2021 by the RU Office.

* cited by examiner

METHOD AND APPARATUS FOR DETERMINING TARGET ROTATION DIRECTION, COMPUTER READABLE MEDIUM AND ELECTRONIC DEVICE

CROSS-REFERENCE TO RELATED APPLICATION

The present application is based upon and claims priority to PCT patent application No. PCT/CN2018/081038 filed on Mar. 29, 2018, which claims the priority to the invention patent application No. CN201710457547.8, entitled "METHOD AND APPARATUS FOR DETERMINING ROTATION DIRECTION OF TARGET", and filed on Jun. 16, 2017, the entire content of which is incorporated herein by reference for all purpose.

TECHNICAL FIELD

The present disclosure relates to the technical field involving video image processing, and in particular, to a method and apparatus for determining a rotation direction of a target, a computer readable medium and an electronic device.

BACKGROUND

In a mobile shopping application, a commodity master graph is usually used to show the commodity. The disadvantage is that it is too single and only one perspective of the commodity could be seen. Therefore, a master video of the commodity is currently used on some e-commerce platforms, but the disadvantage of this manner is that the occupied bandwidth is too large.

Therefore, there is still a need for improvement in the related art.

It should be noted that the information disclosed in the background section above is only for enhancing the understanding of the background of the present disclosure, and thus may include information that does not constitute prior art known to those of ordinary skill in the art.

SUMMARY

An object of the present disclosure is to provide a method and apparatus for determining a rotation direction of a target, a computer readable medium, and an electronic device, so as to overcome one or more problems due to limitations and disadvantages of the related art at least to some extent.

Other characteristics and advantages of the present disclosure will be apparent from the following detailed description, or acquired in part by the practice of the present disclosure.

According to an aspect of the present disclosure, a method for determining a rotation direction of a target is provided, including: inputting continuous video frames including a rotation target; establishing a background model according to a first frame image in the video frames; performing a foreground detection on each video frame other than a first frame, and determining a rotation axis center of the rotation target by using the background model; obtaining a distribution of optical flow points within a preset area of the rotation axis center; and determining a rotation direction of the rotation target according to the distribution of the optical flow points within the preset area.

In an exemplary embodiment of the present disclosure, the performing the foreground detection on each video frame other than the first frame by using the background model, and determining the rotation axis center of the rotation target includes: storing a sample set for each background point in the first frame image by the background model, so as to generate a background sample set; locating foreground points in each video frame other than the first frame according to the background sample set; performing a statistical analysis on the foreground points in each video frame other than the first frame and determining a foreground image area of the rotation target; and taking a center point of the foreground image area as the rotation axis center of the rotation target.

In an exemplary embodiment of the present disclosure, the performing the statistical analysis on the foreground points in each video frame other than the first frame and determining the foreground image area of the rotation target includes: when determining that a foreground range within a preset frame reaches a maximum according to the foreground points in each video frame other than the first frame, taking the foreground in the corresponding video frame when the foreground range reaches the maximum as the foreground image area.

In an exemplary embodiment of the present disclosure, the distribution of optical flow points within the preset area of the rotation axis center is obtained by using an optical flow method, including: tracking and recording the optical flow points on the rotation target using an optical flow method; screening the optical flow points within the preset area of the rotation axis center according to coordinate information of each optical flow point; and performing a statistics on numbers of optical flow points in a first direction and a second direction within the preset area of the rotation axis center respectively.

In an exemplary embodiment of the present disclosure, the screening the optical flow points within the preset area of the rotation axis center according to coordinate information of each optical flow point includes: calculating an absolute value of a difference between an x coordinate of the rotation axis center and an x coordinate of each optical flow point; and when the absolute value is less than a preset threshold, selecting a corresponding optical flow point to be within the preset area of the rotation axis center.

In an exemplary embodiment of the present disclosure, the determining the rotation direction of the rotation target according to the distribution of the optical flow points within the preset area includes: determining the rotation direction of the rotation target according to the numbers of the optical flow points in the first direction and the second direction.

In an exemplary embodiment of the present disclosure, the method further includes: determining whether the input video frames are color images; and when the video frames are the color images, converting the color images into grayscale images.

According to an aspect of the present disclosure, an apparatus for determining a rotation direction of a target includes: an input module, configured to input continuous video frames including a rotation target; a background modeling module, configured to establish a background model according to a first frame image in the video frames; a foreground detection module, configured to perform a foreground detection on each video frame other than the first frame by using the background model, and determine a rotation axis center of the rotation target; an optical flow point distribution obtaining module, configured to obtain a distribution of optical flow points within a preset area of the rotation axis center; and a rotation direction determining module, configured to determine a rotation direction of the rotation target according to the distribution of the optical flow points within the preset area.

According to an aspect of the present disclosure, there is provided a computer readable medium stored a computer program thereon. When the program is executed by a processor, the method for determining a rotation direction of a target in the above embodiment is implemented.

According to an aspect of the present disclosure, an electronic device is provided, including: one or more processors; and a storage device, configured to store one or more programs; wherein when the one or more programs are executed by the one or more processors, the one or more processors implement the method for determining a rotation direction of a target in the above embodiment.

By determining a rotation axis center of a rotation target in a video image by a foreground detection method and determining a rotation direction of the rotation target by using an optical flow method, the method and apparatus for determining a rotation direction of a target provided by the exemplary embodiments of the present disclosure are simple and effective, and can quickly calculate and obtain the rotational clock direction of the rotation target.

It should be understood that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. It is apparent that the drawings in the following description show only some of the embodiments of the present disclosure, and other drawings may be obtained by those skilled in the art according to these drawings without paying inventive labor.

DETAILED DESCRIPTION

Figure 1:
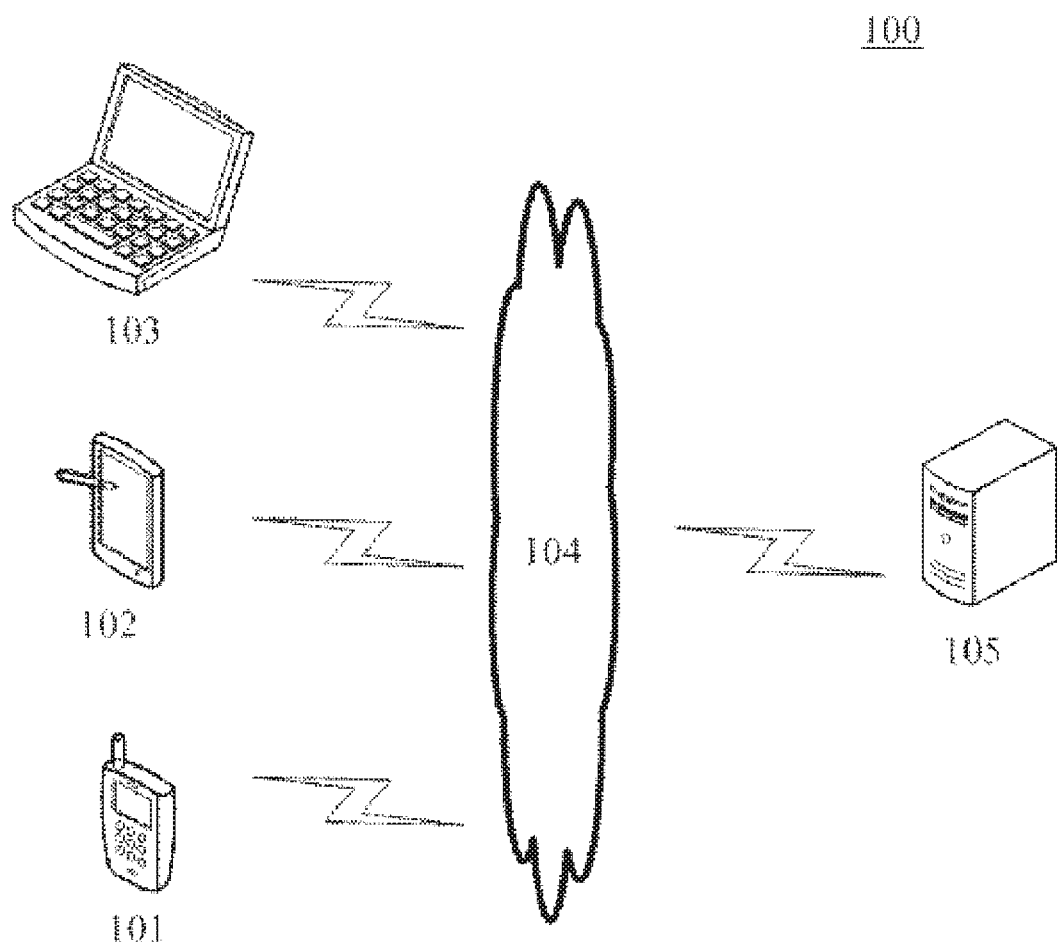
FIG. 1 schematically shows a system architecture diagram to which a method for determining a rotation direction of a target or an apparatus for determining a rotation direction of a target of the present application may be applied.

Example embodiments will now be described more fully with reference to the accompanying drawings. However, the embodiments may be implemented in a variety of forms and should not be construed as being limited to the examples set forth herein; rather, these embodiments are provided so that this disclosure may be more complete and the concept of the exemplary embodiments may be fully conveyed to those skilled in the art. The described features, structures, or characteristics may be combined in one or more embodiments in any suitable manner.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor apparatuses and/or microcontroller apparatuses.

For the problem mentioned in the above Background section that the occupied bandwidth is too large since the e-commerce platform employs the video of the master graph of the commodity to show the commodity, screenshots of a 360-degree rotating video of the commodity may be used for replacing the video of the master graph of the commodity, so that different perspectives of the commodity can be seen when the user rotates the mobile phone. For example, when the mobile phone is turned left, the user may see the left side of the commodity; and when the mobile phone is turned right, the user may see the right side of the commodity. It is required that the rotation direction of the 360-degree rotation of the commodity is clockwise.

However, the video of the master graph of the commodity uploaded by some merchants is counterclockwise, and additional processing is required to turn it to be clockwise. In this case, firstly, it is required to detect the rotation direction of the commodity in the video uploaded by the merchant to the e-commerce platform, so as to facilitate subsequent video frame clipping processing. In the related art, it is necessary to use a complicated hardware structure to detect the rotation direction of the commodity, and the rotation direction of the commodity cannot be detected from the video.

FIG. 1 schematically shows a system architecture diagram to which a method for determining a rotation direction of a target or an apparatus for determining a rotation direction of a target of the present application may be applied.

As shown in FIG. 1, a system architecture 100 may include terminal devices 101, 102, 103, a network 104, and a server 105. The network 104 is configured to provide a medium for communication links between the terminal devices 101, 102, 103 and the server 105. The network 104 may include various types of connections, such as wired, wireless communication links, fiber optic cables, and the like.

The user may interact with the server 105 over the network 104 using the terminal devices 101, 102, 103 to receive or transmit messages and the like. Various communication client applications, such as a shopping application, a web browser application, a search application, an instant communication tool, a mailbox client, a social platform software, and the like, may be installed in the terminal devices 101, 102, and 103.

The terminal devices 101, 102, 103 may be various electronic devices having a display screen and supporting web browsing, including but not limited to smartphones, tablets, laptop portable computers, desktop computers, and the like.

The server 105 may be a server that provides various services, such as a background management server that provides support for various video image data and the like submitted by the user using the terminal devices 101, 102, 103. The background management server may perform processing such as rotation direction detection on the received video image data, and feed back the processing result (for example, adjusting the counterclockwise video uploaded by the merchant to be clockwise and performing video frame clipping) to the terminal device.

It should be noted that the method for determining a rotation direction of a target provided by the embodiment of the present application is generally performed by the server 105. Accordingly, the apparatus for determining a rotation direction of a target is generally disposed in the server 105.

It should be understood that the numbers of the terminal devices, networks, and servers in FIG. 1 are merely illustrative. Depending on the implementation needs, there may be any numbers of the terminal devices, networks, and servers.

Figure 2:
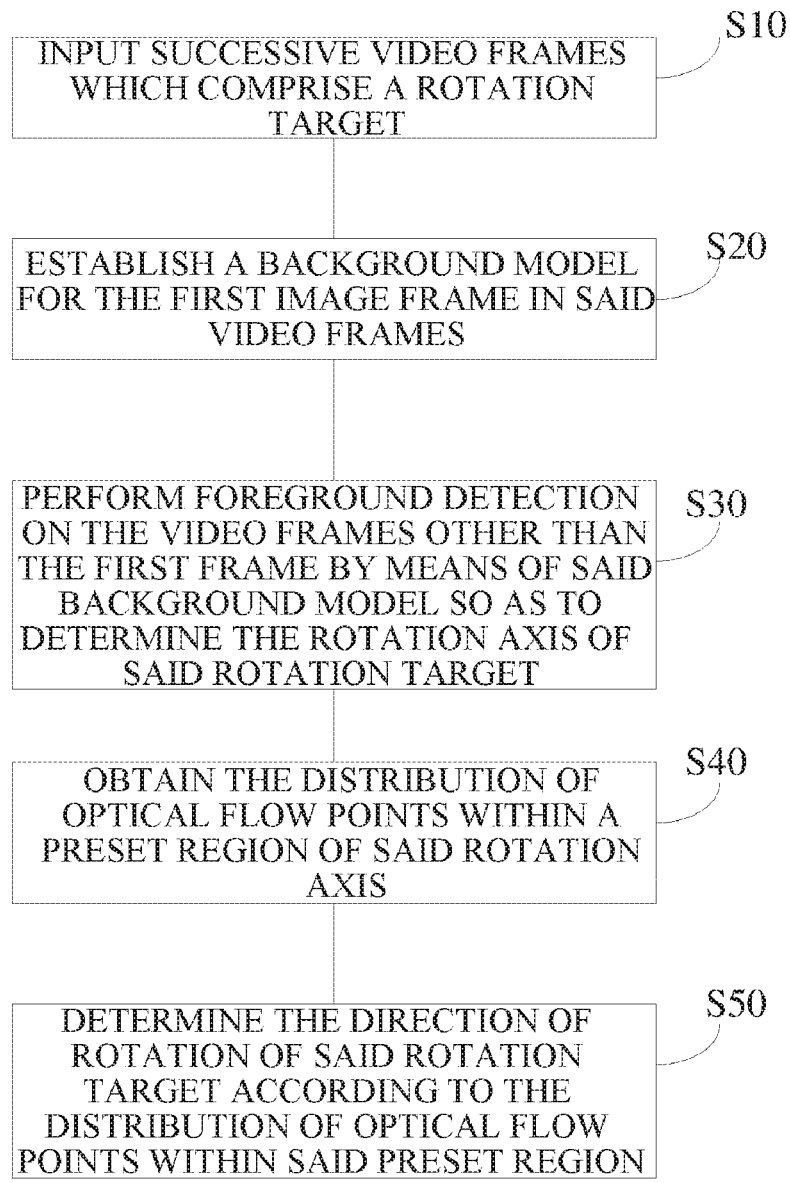
FIG. 2 schematically shows a flow chart of a method for determining a rotation direction of a target in an exemplary embodiment of the present disclosure.

FIG. 2 schematically shows a flow chart of a method for determining a rotation direction of a target in an exemplary embodiment of the present disclosure.

As shown in FIG. 2, the method for determining a rotation direction of a target may include the following steps.

In step S10, continuous video frames including a rotation target are input.

In the embodiment of the present disclosure, the rotation target may be an item, an object or a commodity in the video frame, but the present disclosure is not limited thereto.

In an exemplary embodiment, the method may further include: determining whether the input video frames are color images; and converting the color images into grayscale images when the video frames are the color images.

In an embodiment of the present disclosure, the input continuous video frames may be grayscale images. When the input video frame is the color image, it may be converted to the grayscale image using the following formula:

$$Gray=0.299R+0.587G+0.114B$$

In step S20, a background model is established according to a first frame image in the video frames.

In the embodiments of the present disclosure, the background modeling is performed by distinguishing and recognizing the foreground and the background based on whether the background and the foreground differ in terms of motion, direction of motion, color, and the like.

In the embodiment of the present disclosure, the establishment of the background model may be completed by using the first frame image. For one pixel, the pixel values of its neighbor points are randomly selected as its model sample value.

$$M0(x)=\{v0(y|y\in NG(x))\}$$

At an initial time t=0, NG(x) is the neighbor point. Generally, an area of 3*3 around the pixel x may be taken as NG(x), and the number of samplings may be set to 20 times, so that the background model stores a sample set for each background point.

It should be noted that the above-mentioned area of 3*3 around the pixel x may be taken as NG(x), and the number of samplings may be set to 20 times for illustration only, and is not intended to limit the protection scope of the present disclosure, and the values may be selected based on the actual situation.

In step S30, a foreground detection is performed on each video frame other than the first frame by using the background model, and a rotation axis center of the rotation target is determined.

Figure 3:
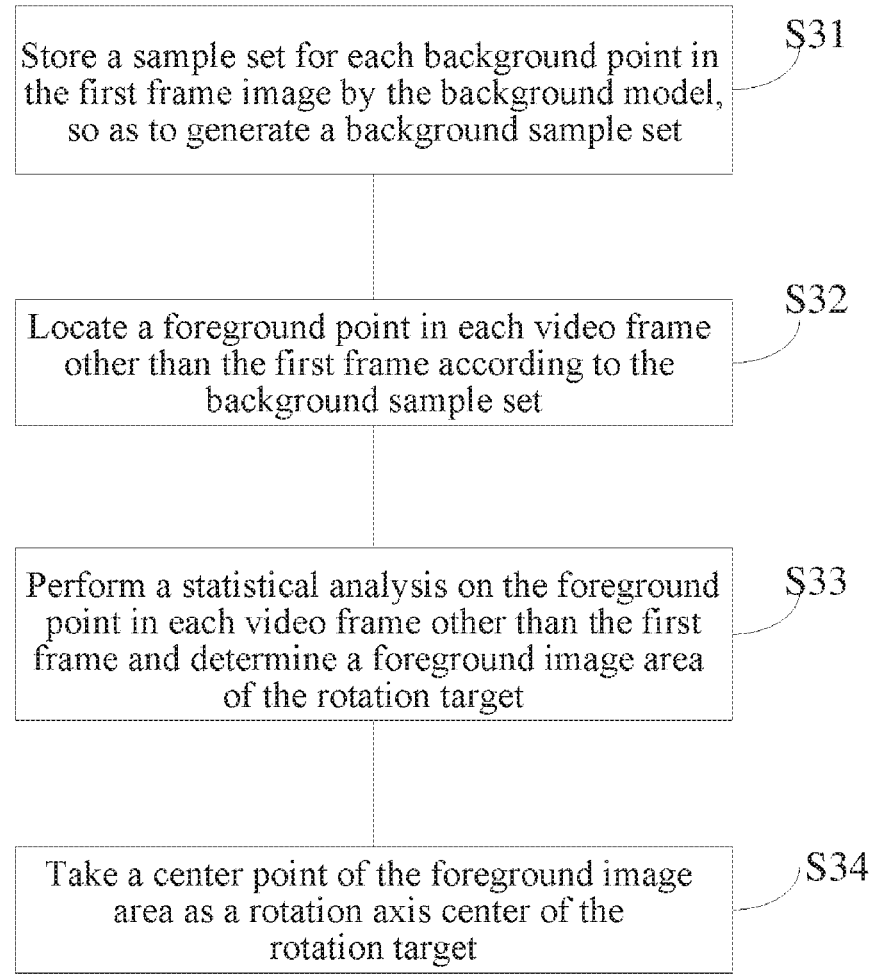
FIG. 3 schematically shows a flow chart of a method for determining a rotation axis center of a rotation target in an exemplary embodiment of the present disclosure.

FIG. 3 schematically shows a flow chart of a method for determining a rotation axis center of a rotation target in an exemplary embodiment of the present disclosure. As shown in FIG. 3, the method of determining the rotation axis center of the rotation target may include the following steps.

In step S31, a sample set is stored for each background point in the first frame image by the background model, thereby generating a background sample set.

In step S32, foreground points in each video frame other than the first frame is located according to the background sample set.

In step S33, a statistical analysis is performed on the foreground points in each video frame other than the first frame and a foreground image area of the rotation target is determined.

In an exemplary embodiment, the performing a statistical analysis on the foreground points in each video frame other than the first frame and determining a foreground image area of the rotation target includes: when determining that a foreground range within a preset frame reaches a maximum according to the foreground points in each video frame other than the first frame, taking the foreground in the corresponding video frame when the foreground range reaches the maximum as the foreground image area.

In step S34, a center point of the foreground image area is taken a as a rotation axis center of the rotation target.

In an embodiment of the present disclosure, the background model is updated using a number of continuous video frames subsequently (i.e., other continuous video frames other than the first frame image). Each new pixel value is compared to the sample set to determine if it belongs to a background point. It can be known that if a new observation value belongs to the background point, it should be closer to the sampled value in the sample set.

For example, it is assumed that the pixel value of the x coordinate point of the current video frame is v(x); M(x)={V1, V2, . . . VN} is the background model of the x coordinate point, and the model parameter is composed of N values (obtaining by collecting historical pixels and neighbor pixels), and M(x) is in a state of constant change and update. For the pixel value v(x) of the x coordinate point of the current video frame, it is calculated with the N values in M(x) as follows:

1) calculating a distance S between v(x) and each value;
2) recording the number C of the distance S being less than a preset radius R (for example, 50); and
3) comparing C with a given threshold #min (for example, 2), wherein if C is greater than the threshold #min, the pixel of the x coordinate point is considered to be from the background, and is determined as the background point; otherwise, it is determined as the foreground point.

It is assumed that SR(v(x)) is an area with a radius of R and centered on x. The intersection may be used to formalize the above content, i.e., if M(x)[{SR(v(x))∩{V1, V2, . . . , VN}}] is greater than a given threshold #min, then the x point is considered to be a background point, otherwise, it is considered to be a foreground point. In the embodiment of the present disclosure, it is illustrated by taking #min as 2 and taking radius R as 50, but the present disclosure is not limited thereto.

Next, statistical analysis is performed on all points that are determined to be foreground points: if there is no "expansion action" in the foreground within P (for example, 100, but the present disclosure is not limited thereto) frames, then the foreground image area of the rotating object is considered to be fixed. At this time, the center point of the foreground image area is taken as the rotation axis center.

In the embodiment of the present disclosure, the determination that there is no "expansion action" in the foreground within the P (here, taking 100 as an example) frames may be performed by determining that the foreground range within the 100 frames no longer expands. That is, when the foreground range in a certain video frame within the 100 frames reaches a maximum, the foreground of the rotating object in the video frame is taken as the foreground image area of the rotating object. This is because the shape of the rotation commodity in the video uploaded by the merchant is usually irregular, and at the same time, the commodity is not located at the center of the video frame. Therefore, it is necessary to determine the rotation axis center of the commodity. When the commodity rotates, the foreground range of the previous frame may be smaller. As the commodity rotates, the foreground ranges of the subsequent frames may gradually increase. After the maximum value of the foreground range is reached, the foreground range is gradually reduced. For example, it is assumed that a rotation video of a book is uploaded by the merchant, the spine (i.e., the smallest area of the book) is facing the user at the initial moment, and the foreground range detected by the current video frame is smallest. As the book rotates counterclockwise or clockwise, the foreground ranges of the book detected in subsequent video frames will gradually increase, until the cover of the book is completely facing the user. At this moment, the foreground range detected by the corresponding video frame is the largest, and the foreground range in this video frame may be taken as the foreground image area of the book.

In step S40, a distribution of optical flow points in a preset area of the rotation axis center is obtained.

The optical flow is a simple and practical expression of image motion, usually defined as the apparent motion of the image brightness pattern in a sequence of images, i.e., the expression of the motion velocity of the point on the surface of the spatial object on the imaging plane of the visual sensor.

Figure 4:
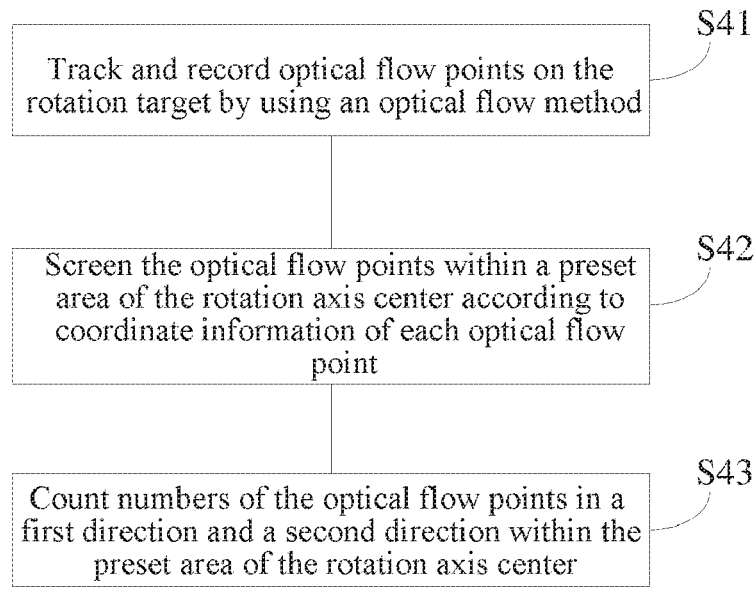
FIG. 4 schematically shows a flow chart of a method for obtaining a distribution of optical flow points within a preset area of a rotation axis center in an exemplary embodiment of the present disclosure.

FIG. 4 schematically shows a flow chart of a method for obtaining a distribution of optical flow points within a preset area of a rotation axis center in an exemplary embodiment of the present disclosure. As shown in FIG. 4, the method for obtaining a distribution of optical flow points within a preset area of a rotation axis center may include the following steps.

In step S41, the optical flow points on the rotation target are tracked and recorded using an optical flow method.

In step S42, the optical flow points within the preset area of the rotation axis center are screened according to coordinate information of each optical flow point.

In an exemplary embodiment, according to the coordinate information of each optical flow point, the screening the optical flow points within the preset area of the rotation axis center according to coordinate information of each optical flow point may include: calculating an absolute value of a difference between an x coordinate of the rotation axis center and an x coordinate of each optical flow point; and when the absolute value is less than a preset threshold, selecting a corresponding optical flow point to be within the preset area of the rotation axis center.

In step S43, the numbers of the optical flow points in a first direction and a second direction within the preset area of the rotation axis center are counted respectively.

In the embodiments of the present disclosure, the optical flow involves two main concepts: a motion field and an optical flow field. It is assumed that the gray value of the point $m=(x, y)^T$ (where T represents the time set) on the image at the time t is I(x, y, t), and after the time interval dt, the gray level of the corresponding point is I (x+dx, y+dy, t+dt), when dt→0, the gray of the two points may be considered unchanged, that is:

$$I(x+dx, y+dy, t+dt) = I(x, y, t).$$

If the grayscale of the image changes slowly with x, y, t, Taylor series expansion may be performed on the left side of the above formula:

$$I(x+dx, y+dy, t+dt) = I(x, y, t) + \frac{\partial I}{\partial x}dx + \frac{\partial I}{\partial y}dy + \frac{\partial I}{\partial t}dt + \varepsilon,$$

wherein, ε represents the second order infinitesimal term. Since dt→0, and ε is ignored, the following may be obtained:

$$\frac{\partial I}{\partial x}dx + \frac{\partial I}{\partial y}dy + \frac{\partial I}{\partial t}dt = 0,$$

let $$\mu = \frac{dx}{dt}, v = \frac{dy}{dt}$$

represent the optical flows in the x, y directions, $$I_x = \frac{\partial I}{\partial x}, I_y = \frac{\partial I}{\partial y}, I_t = \frac{\partial I}{\partial t}$$

respectively represent the partial derivative of the image grayscale relative to x, y, t, the above formula may be written as:

$$I_x\mu + I_y v + I_t = 0.$$

The above formula is the basic equation of the optical flow field, which may be written in vector form, i.e.:

$$\nabla I \cdot V_m + I_t = 0$$

wherein, $\nabla I = (I_x, I_y)$ is the gradient of the image at point m, and $Vm = (\mu, v)$ is the optical flow of the point m.

The above formula is called an optical flow constraint equation. The advantage of using the optical flow method in the embodiments of the present disclosure is that the optical flow point contains motion information, and the position of the moving object can be calculated without knowing the information of any scene.

In the embodiment of the present disclosure, while calculating the foreground image area and the rotation axis center, the optical flow method may be used to track the feature points (i.e., optical flow points) on the rotating object, and the direction vector and the position thereof, such as coordinate information, are recorded.

In step S50, the rotation direction of the rotation target is determined according to the distribution of the optical flow points within the preset area.

In an exemplary embodiment, the determining a rotation direction of the rotation target according to the distribution of the optical flow points within the preset area includes: determining the rotation direction of the rotation target according to the numbers of optical flow points in the first direction (such as the clockwise direction) and the second direction (such as the counterclockwise direction).

In the embodiment of the present disclosure, when the rotation axis center is determined, the optical flow point(s) located near the rotation axis center is screened according to the recorded coordinate information of all the optical flow points. The screening method may be:

$$|Px-Cx|<dist,$$

wherein, Px is the x coordinate of the optical flow point, Cx is the x coordinate of the rotation axis center, and dist may be taken as 25 by default, but the present disclosure is not limited thereto. Thereafter, the numbers of the optical flow points in the clockwise and counterclockwise directions within the vicinity of the rotation axis center are counted, and the direction in which the number of optical flow points is larger is taken as the rotation direction of the rotation target.

It should be noted that the above formula for screening the optical flow point near the rotation axis center only considers that the x coordinate of the rotation axis center and the x coordinate of each optical flow point are based on such an image coordinate system: that is, generally, for an image, an upper left corner thereof is positioned as the coordinate origin, and a vertical direction downward from the coordinate origin is the y-axis, and a horizontal direction to the right relative to the coordinate origin is the x-axis. In the e-commerce platform application scenario, the commodity is usually rotated clockwise or counterclockwise along the x-axis direction, so the coordinates of the y-axis direction are not concerned.

The method for determining the rotation direction of the target provided by the embodiment of the present disclosure uses the foreground detection and the optical flow method to determine the clockwise direction of the rotation of the item in the video, which is simple and efficient, and can quickly calculate the clockwise direction of the rotation of the item.

It should be noted that, in the embodiment of the present disclosure, the determination of the rotation direction of the item refers to that the clockwise direction of the rotation of the item is determined when the item displayed in the specific video is performing the rotation action.

Figure 5:
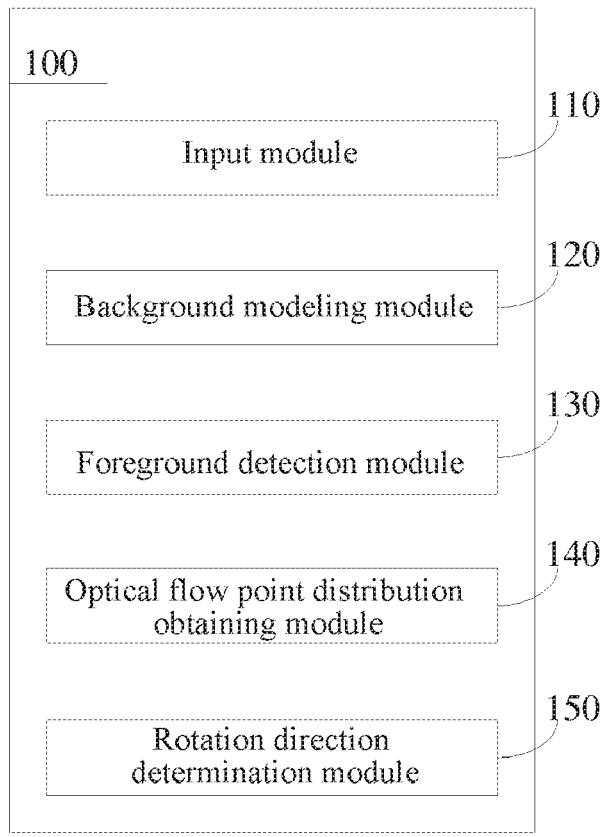
FIG. 5 schematically shows a block diagram of an apparatus for determining a rotation direction of a target in an exemplary embodiment of the present disclosure.

FIG. 5 schematically shows a block diagram of an apparatus for determining a rotation direction of a target in an exemplary embodiment of the present disclosure.

As shown in FIG. 5, the apparatus 100 for determining a rotation direction of a target may include an input module 110, a background modeling module 120, a foreground detection module 130, an optical flow point distribution obtaining module 140, and a rotation direction determination module 150.

The input module 110 may be configured to input a continuous video frame including a rotation target.

The background modeling module 120 may be configured to establish a background model according to a first frame image in the video frame.

The foreground detection module 130 may be configured to perform a foreground detection on each video frame other than the first frame by using the background model, and determine a rotation axis center of the rotation target.

In an exemplary embodiment, the foreground detection module 130 may further include a sample set generation unit, a foreground point location unit, a foreground image area determination unit, and a rotation axis center obtaining unit.

The sample set generating unit may be configured to store one sample set for each background point in the first frame image by the background model, thereby generating a background sample set. The foreground point location unit may be configured to locate a foreground point in each video frame other than the first frame according to the background sample set. The foreground image area determining unit may be configured to perform a statistical analysis on the foreground point in each video frame other than the first frame and determine a foreground image area of the rotation target. The rotation axis center obtaining unit may be configured to take a center point of the foreground image area as a rotation axis center of the rotation target.

In an exemplary embodiment, the foreground image area determining unit may further include a foreground image area determining subunit, and the foreground image area determining subunit may be configured to, when it is determined that a foreground range within a preset frame reaches a maximum according to the foreground point in each video frame other than the first frame, take the foreground in the corresponding video frame when the foreground range reaches the maximum as the foreground image area.

The optical flow point distribution obtaining module 140 may be configured to obtain a distribution of optical flow points in a preset area of the rotation axis center.

In an exemplary embodiment, the optical flow point distribution obtaining module 140 may further include an optical flow point tracking and recording unit, an optical flow point screening unit, and an optical flow point statistics unit.

The optical flow point tracking and recording unit may be configured to track and record the optical flow points on the rotation target using an optical flow method. The optical flow point screening unit may be configured to screen the optical flow points within the preset area of the rotation axis center according to coordinate information of each optical flow point. The optical flow point statistics unit may be configured to perform a statistics on the numbers of optical flow points in a first direction and a second direction in the preset area of the rotation axis center respectively.

In an exemplary embodiment, the optical flow point screening unit may further include a difference calculation subunit and a determination subunit.

The difference calculation subunit may be configured to calculate an absolute value of a difference between an x coordinate of the rotation axis center and an x coordinate of each optical flow point. The determining subunit may be configured to, when the absolute value is less than the preset threshold, select a corresponding optical flow point to be within the preset area of the rotation axis center.

The rotation direction determining module 150 may be configured to determine a rotation direction of the rotation target according to a distribution of optical flow points in the preset area.

In an exemplary embodiment, the rotation direction determining module 150 may further include a rotation direction determining unit, and the rotation direction determining unit is configured to determine the rotation direction of the rotation target according to the numbers of optical flow points in the first direction and the second direction.

In an exemplary embodiment, the apparatus 100 for determining a rotation direction of a target may further include a determination module and a conversion module.

The determining module may be configured to determine whether the input video frame is a color image. The conversion module may be configured to, when the video frame is the color image, convert the color image into a grayscale image.

It should be noted that the specific details of each module unit in the apparatus for determining a rotation direction of a target have been described in detail in the corresponding method for determining a rotation direction of a target, and details are not described herein again.

It should be noted that although several modules or units of apparatus for executing actions are described above, such division is not mandatory. In fact, features and functions of two or more of the modules or units described above may be embodied in one module or unit in accordance with the embodiments of the present disclosure. Alternatively, the features and functions of one module or unit described above may be further divided into multiple modules or units.

In addition, although the various steps of the method in the present disclosure are described in a specific order in the drawings, this is not required or implied that the steps must be performed in the specific order, or all the steps shown must be performed to achieve the desired result. Additionally or alternatively, certain steps may be omitted, multiple steps may be combined into one step, and/or one step may be decomposed into multiple steps and so on.

Figure 6:
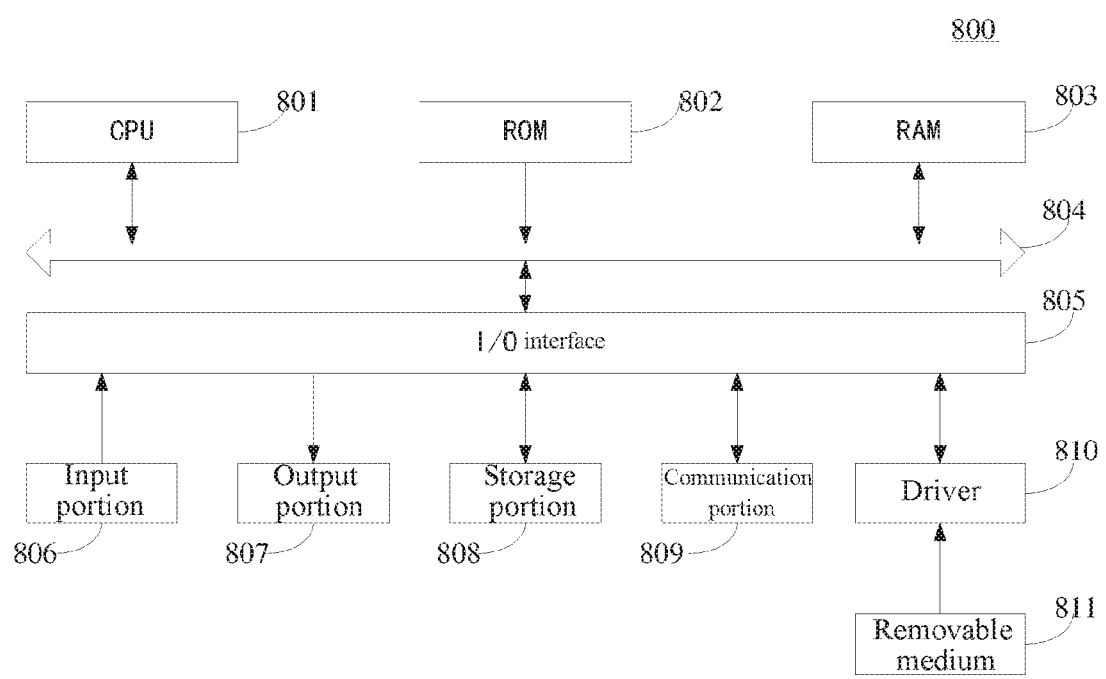
FIG. 6 schematically shows a block diagram of an electronic device in an exemplary embodiment of the present disclosure.

Referring now to FIG. 6, a block diagram of an electronic device 600 suitable for implementing embodiments of the present application is shown. The electronic device shown in FIG. 6 is merely an example, and should not impose any limitation on the function and scope of use of the embodiments of the present application.

As shown in FIG. 6, the electronic device 600 includes a central processing unit (CPU) 601 that may perform various appropriate actions and processes in accordance with a program stored in a read only memory (ROM) 602 or a program loaded from the storage portion 608 into the random access memory (RAM) 603. In the RAM 603, various programs and data required for the operations of the system 600 are also stored. The CPU 601, the ROM 602, and the RAM 603 are connected to each other through a bus 604. An input/output (I/O) interface 605 is also coupled to the bus 604.

The following components are connected to the I/O interface 605: an input portion 606 including a keyboard, a mouse, etc.; an output portion 607 including such as a cathode ray tube (CRT), a liquid crystal display (LCD), a loudspeaker and the like; a storage portion 608 including a hard disk or the like; and a communication portion 609 including a network interface card such as a LAN card, a modem, or the like. The communication portion 609 performs communication processing via a network such as the Internet. A driver 610 is also coupled to I/O interface 605 as needed. A removable medium 611, such as a magnetic disk, an optical disk, a magneto-optical disk, a semiconductor memory or the like, is mounted on the driver 610 as needed so that a computer program read therefrom is installed into the storage portion 608 as needed.

In particular, the processes described above with reference to the flowcharts may be implemented as a computer software program in accordance with an embodiment of the present disclosure. For example, an embodiment of the present disclosure includes a computer program product including a computer program carried on a computer readable medium, and the computer program includes the program code for executing the method illustrated in the flowchart. In such an embodiment, the computer program may be downloaded and installed from the network via the communication portion 609, and/or installed from the removable media 611. When the computer program is executed by the central processing unit (CPU) 601, the above-described functions defined in the system of the present application are executed.

The flowchart and block diagrams in the drawings illustrate the architecture, functionality, and operation of possible implementations of apparatus, methods, and computer program products in accordance with various embodiments of the present application. In this regard, each block of the flowchart or block diagrams may represent a module, a program segment, or a portion of code that includes one or more executable instructions for implementing the prescribed logical functions. It should also be noted that in some alternative implementations, the functions marked in the blocks may also occur in a different order than that illustrated in the drawings. For example, two successively represented blocks may in fact be executed substantially in parallel, and they may sometimes be executed in the reverse order, depending upon the functionality involved. It is also noted that each block of the block diagrams or flowcharts, and combinations of blocks in the block diagrams or flowcharts, may be implemented by a dedicated hardware-based system that performs the specified function or operation, or may be implemented with a combination of dedicated hardware and computer instructions.

The units involved in the embodiments of the present application may be implemented by software or by hardware. The described units may also be provided in the processor. For example, it may be described that a processor includes a transmitting unit, an obtaining unit, a determining unit and a first processing unit. The names of these units do not constitute a limitation on the units themselves in some cases. For example, the transmitting unit may also be described as "a unit for sending a picture obtaining request to the connected server".

In another aspect, the present application further provides a computer readable medium, which may be included in the device described in the above embodiments, or may be separately present and not assembled in the device. The computer readable medium carries one or more programs, when the one or more programs are executed by the device, the device includes: inputting a continuous video frame including a rotation target; establishing a background model according to a first frame image in the video frame; performing a foreground detection on each video frame other than the first frame, and determining a rotation axis center of the rotation target by using the background model; obtaining a distribution of optical flow points within a preset area of the rotation axis center; and determining a rotation direction of the rotation target according to the distribution of the optical flow points within the preset area.

Other embodiments of the present disclosure will be apparent to those skilled in the art after considering the specification and practicing the present disclosure. The present application is intended to cover any variations, uses, or adaptations of the present disclosure, which are in accordance with the general principles of the present disclosure and include common knowledge or habitual technical means in the art that are not disclosed in the present disclosure. The specification and embodiments are illustrative, and the real scope and spirit of the present disclosure is defined by the appended claims.

What is claimed is:

1. A method for determining a rotation direction of a target, comprising:
   inputting continuous video frames comprising a rotation target;
   establishing a background model according to a first frame image in the video frames;

performing a foreground detection on each video frame other than the first frame by using the background model, and determining a rotation axis center of the rotation target;
tracking and recording optical flow points on the rotation target using the optical flow method;
screening the optical flow points within a preset area of the rotation axis center according to coordinate information of each optical flow point;
performing a statistics on numbers of optical flow points in a first direction and a second direction within the preset area of the rotation axis center respectively; and
determining a rotation direction of the rotation target according to the numbers of the optical flow points in the first direction and the second direction.

2. The method according to claim 1, wherein the performing the foreground detection on each video frame other than the first frame by using the background model, and determining the rotation axis center of the rotation target comprises:
storing a sample set for each background point in the first frame image by the background model, so as to generate a background sample set;
locating foreground points in each video frame other than the first frame according to the background sample set;
performing a statistical analysis on the foreground points in each video frame other than the first frame and determining a foreground image area of the rotation target; and
taking a center point of the foreground image area as the rotation axis center of the rotation target.

3. The method according to claim 2, wherein the performing the statistical analysis on the foreground points in each video frame other than the first frame and determining the foreground image area of the rotation target comprises:
when determining that a foreground range within a preset frame reaches a maximum according to the foreground points in each video frame other than the first frame, taking the foreground in the corresponding video frame when the foreground range reaches the maximum as the foreground image area.

4. The method according to claim 1, wherein the screening the optical flow points within the preset area of the rotation axis center according to coordinate information of each optical flow point comprises:
calculating an absolute value of a difference between an x coordinate of the rotation axis center and an x coordinate of each optical flow point; and
when the absolute value is less than a preset threshold, selecting a corresponding optical flow point to be within the preset area of the rotation axis center.

5. The method according to claim 1, further comprising:
determining whether input video frames are color images; and
when the video frames are the color images, converting the color images into grayscale images.

6. A non-transitory computer-readable medium having stored thereon a computer program, the program being executed by a processor to:
input continuous video frames comprising a rotation target;
establish a background model according to a first frame image in the video frames;
perform a foreground detection on each video frame other than the first frame by using the background model, and determining a rotation axis center of the rotation target;
tracking and recording optical flow points on the rotation target using the optical flow method;
screening the optical flow points within a preset area of the rotation axis center according to coordinate information of each optical flow point;
performing a statistics on numbers of optical flow points in a first direction and a second direction within the preset area of the rotation axis center respectively; and
determining a rotation direction of the rotation target according to the numbers of the optical flow points in the first direction and the second direction.

7. An electronic device, comprising:
one or more processors; and
a storage device for storing one or more programs;
wherein when the one or more programs are executed by the one or more processors, the one or more processors are configured to:
input continuous video frames comprising a rotation target;
establish a background model according to a first frame image in the video frames;
perform a foreground detection on each video frame other than the first frame by using the background model, and determining a rotation axis center of the rotation target;
track and record optical flow points on the rotation target using the optical flow method;
screen the optical flow points within a preset area of the rotation axis center according to coordinate information of each optical flow point;
perform a statistics on numbers of optical flow points in a first direction and a second direction within the preset area of the rotation axis center respectively; and
determine a rotation direction of the rotation target according to the numbers of the optical flow points in the first direction and the second direction.

8. The electronic device according to claim 7, wherein the one or more processors are further configured to:
store a sample set for each background point in the first frame image by the background model, so as to generate a background sample set;
locate foreground points in each video frame other than the first frame according to the background sample set;
perform a statistical analysis on the foreground points in each video frame other than the first frame and determining a foreground image area of the rotation target; and
take a center point of the foreground image area as the rotation axis center of the rotation target.

9. The electronic device according to claim 8, wherein the one or more processors are further configured to:
when determining that a foreground range within a preset frame reaches a maximum according to the foreground points in each video frame other than the first frame, take the foreground in the corresponding video frame when the foreground range reaches the maximum as the foreground image area.

10. The electronic device according to claim 7, wherein the one or more processors are further configured to:
calculate an absolute value of a difference between an x coordinate of the rotation axis center and an x coordinate of each optical flow point; and
when the absolute value is less than a preset threshold, select a corresponding optical flow point to be within the preset area of the rotation axis center.

11. The electronic device according to claim 7, wherein the one or more processors are further configured to:
   determine whether input video frames are color images; and
   when the video frames are the color images, convert the color images into grayscale images.

\* \* \* \* \*